United States Patent [19]

Br nd Dag A. et al.

[11] Patent Number: 5,333,497
[45] Date of Patent: Aug. 2, 1994

[54] METHOD AND APPARATUS FOR CONTINUOUS MEASUREMENT OF LIQUID FLOW VELOCITY

[75] Inventors: Br nd Dag A., Trondheim; Knut Bonvik, Gjolme; Svein Wognild, Hell, all of Norway

[73] Assignee: Metron AS, Trondheim, Norway

[21] Appl. No.: 970,374

[22] Filed: Nov. 2, 1992

[30] Foreign Application Priority Data

Nov. 5, 1991 [NO] Norway .................. 914330

[51] Int. Cl.⁵ .............................. G01F 13/00
[52] U.S. Cl. ................................ 73/219; 73/861
[58] Field of Search ............ 73/861, 219, 223, 861.56

[56] References Cited

U.S. PATENT DOCUMENTS

5,043,074  8/1991  Chevallet ................ 73/219
5,099,698  3/1992  Kath et al. ............. 73/861.56

FOREIGN PATENT DOCUMENTS

0224874  6/1987  European Pat. Off. ...... G01F 23/28
2594340  8/1987  France ..................... A61M 1/16
60-140121  7/1985  Japan ...................... G01F 1/05

Primary Examiner—Richard E. Chilcot, Jr.
Assistant Examiner—Harshard Patel
Attorney, Agent, or Firm—Cushman Darby & Cushman

[57] ABSTRACT

Method and apparatus for continuous measurement of liquid flow velocity, where there are positioned risers between respective line light sources and where between the risers there is positioned at least one CCD image sensor. The risers are joined together at one end thereof and are connected with the surroundings via a valve. At the other end, the risers are connected with a liquid stream supply line via three-way valves. The three-way valves are joined together via a return outlet with the return line for the liquid stream.

6 Claims, 1 Drawing Sheet

METHOD AND APPARATUS FOR CONTINUOUS MEASUREMENT OF LIQUID FLOW VELOCITY

BACKGROUND OF THE INVENTION

The present invention relates to a method and apparatus for continuous measurement of liquid flow velocities and, more specifically, continuous detection of low velocities of flow for liquids.

Flow meters in use today utilize a technique based on a riser with light-emitting diodes and phototransistors. The flow measurements are carried out by reading the point in time at which a liquid surface passes a sensor, and by calculating the time difference when the liquid passes an additional sensor. The distance between the sensors and the diameter of the pipe are known, and the average velocity of flow for the time interval may thus be calculated. When the velocity of flow has been calculated, the riser must be drained before a new flow velocity may be calculated.

When there is air in the pipe, a part of the light will be reflected by the interior glass-air transition in the pipe.

When there is liquid in the pipe, the light will pass almost through without being diffused. This means that the quantity of light reaching the phototransistor for the light-emitting diode is dependent on whether there is air or liquid in the pipe. It is therefore possible to detect an absence of a liquid at a specific place in the pipe.

British patent no. 1 426 824 describes a method for improving the contrast during detection of an absence of liquid. It is described therein that, instead of measuring the passage of light in the pipe, one measures the light reflected at an approximately 105-degree angle in relation to the light source when the pipe is empty. There is greater contrast between the liquid and air for the reflecting light than for light that passes directly through the pipe. A disadvantage with the previously known devices is that it is impossible to place discrete phototransistors in close enough physical proximately to each other to achieve continuous detection of low velocities of flow. The distance between the sensor elements will result in considerable inaccuracy for low flow velocities since the position of the liquid surface cannot be determined with sufficient precision. Only average measurements can be made.

In that British patent, the use of discrete light-emitting diodes will give an inhomogeneous light, which makes it difficult to determine the position of the liquid surface beyond merely a rough, point by point detection.

Nor, in that British patent, is continuous measurement possible, since the riser must be drained between each measurement.

Nor would it be possible to carry out a flow measurement at specific time intervals since, in that British patent, one undertakes measurement of the time that it takes for the surface to move from one sensor element to another.

SUMMARY OF THE INVENTION

The purpose of the present invention is to enable a continuous position determination of a liquid surface and, thereby, the detection of flows even in the case of low velocities of flow, i.e., less than 0.1 ml/hour.

It is also an objective of the invention to avoid the problem of inhomogeneous light with regard to continuous position finding of the liquid surface.

In addition, it is an objective of the invention to provide a system in which there is no draining period when detection of the flow velocity cannot be carried out.

Furthermore, it is an objective of the invention to provide a system capable of measuring the velocity of flow over a time interval which is not determined by the velocity of flow and the distance between the sensor elements. With the previously known technique, it is necessary to wait for a period of time, viz, the time from when the liquid surface passes the first sensor until the liquid surface passes the second sensor, before the velocity of flow can be calculated. With the present invention the objective is that the time may be determined beforehand, and the flows can be calculated on the basis of the movement of the liquid surface.

As a consequence of the use of CCD cell dissolution, it is possible to obtain a continuous reading of the liquid flow and volume which is more accurate than with previously known devices.

Thus, with the aid of the present invention, there is obtained a measurement which is independent of the liquid's mass velocity, transparency and consistency.

The diameter of the measuring glass may be adapted to the requirements for maximum liquid flow and desired accuracy of measurement. In other words, with the aid of the present invention it is possible to adapt to the various requirements for liquid measurement.

With the aid of the present invention there is thus provided a system for controlled drainage which results in retention of a minimum volume of liquid in the riser surface compared with an uncontrolled emptying or drainage.

By virtue of the fact that the CCD image sensor is connected to the A/D converter, it is possible to detect drops on the chamber wall which are caused by retention of liquid volume in the riser on draining/filling. In other words, it is possible to register incorrect measurements and to report them.

BRIEF DESCRIPTION OF THE DRAWINGS

The invention will be described in more detail below, with reference to the drawings, wherein.

DETAILED DESCRIPTION

Figure 1:
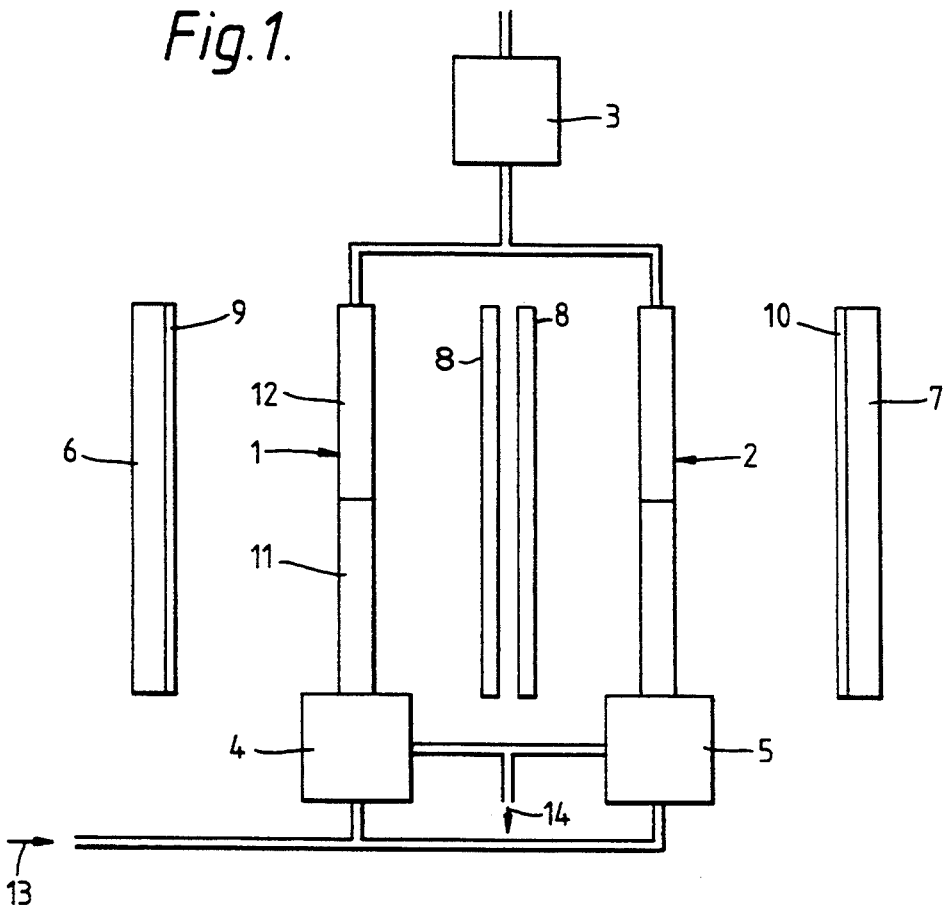
FIG. 1 is a schematic illustration of a system for carrying out the measurements in accordance with the present invention.

FIG. 1 is a schematic illustration of an apparatus for carrying out the method according to the present invention. A liquid stream 13 which is to be measured is supplied to two risers 1, 2 via three-way valves 4, 5. The three-way valves 4, 5 have respective outlet openings connected with the return line 14 for the liquid stream. The risers 1, 2 are joined together at one end thereof and connected to a valve 3 which is in communication with the surroundings. Between risers 1, 2 there is positioned a CCD image sensor 8 which may be a high resolution, light sensitive chip of the type used in video cameras, document scanners and telefax machines. On the other side of risers 1, 2 are arranged respective line light sources 6 and 7, which are integrated LED arrays, each with a built-in convex lens. In order to provide homogeneous light conditions along the entire length of the riser, there are provided diffusers 9, 10 in front of the respective line light sources 6, 7.

As mentioned above, a CCD image sensor 8 is positioned between the risers 1, 2. Either one sensor 8 can serve both risers, or two sensors 8 can be provided, one for each riser. By providing a common CCD image sensor it is possible to reduce the cost of the apparatus, whereas the provision of one CCD image sensor per riser could somewhat improve the quality of the measurements.

Prior to conduction of the flow measurement, riser 1, 2 is filled to a predetermined level relative to the total volume of the riser 1, 2, the specific ratio preferably being half the volume of the total volume.

The filling is done by opening valves 4, 5 and 3. The liquid level is read by the (or the respective) CCD/image sensor 8.

The flow measurement is carried out by conducting liquid into, e.g., riser 1 through valve 4, after which valve 3 is closed. The overpressure created at the top of riser 1 will then bear down on the liquid in riser 2 and force the liquid out of the riser. Light source 6 is lit, while light source 7 is extinguished.

Figure 2:
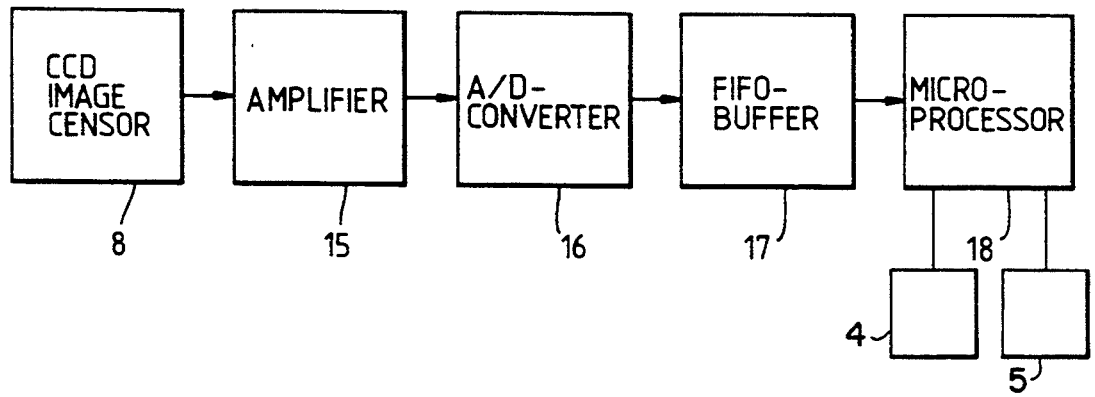
FIG. 2 is a schematic block diagram of the electronic aspect of the measurement calculations in accordance with the present invention.

The liquid level may now be read continuously in riser 1. The homogenous light for line light source 6 through the diffuser 9 passes through riser 1 and hits CCD image sensor 8. Where there is air 12 in the riser, the light is partially diffused. Where there is liquid 11 in the pipe, the light passes through relatively unhindered. This results in a difference in the light intensity in the picture on the respective CCD image sensor 8. The signal from the CCD image sensor is conducted to a measurement amplifier 15, cf. FIG. 2, which amplifies the differences between light and darkness. The signal is conducted from amplifier 15 into an analog/digital converter 16. The digitalized signal is input to a first-in/first-out buffer (FIFO) 17. From the FIFO buffer 17 the signal is read by microprocessor 18. The microprocessor is programmed to recognize differences in values for light and darkness and thereby to find the liquid surface. The position of the liquid surface can now be determined continuously in riser 1. By recording the time and measuring the distance from the level of the liquid surface at the starting point to the level of the liquid surface at the stopping point, the velocity of flow can be precisely determined via microprocessor 18.

When riser 1 is full, valve 4 is closed off to the supply of liquid, but the return opening for valve 4 is opened. Valve 5 for supply of liquid is opened, and the outlet of valve 5 to the return line is closed. Light source 6 is extinguished, and light source 7 is lit. The position of the liquid surface in riser 2 is now determined, while the overpressure for riser 2 drives the liquid out of riser 1. By virtue of this turning of the liquid stream, the flow measurement may be carried out continuously and is thus not limited by a draining phase for the riser.

As a result of using a CCD image sensor in connection with an A/D converter, it is possible to carry out very accurate measurements; and the curvature at the surface as a consequence of the liquid's surface tension may be registered and can form the basis for a correction factor for the liquid volume as a result of the curvature. This correction factor is registered by the microprocessor and incorporated into the calculation of the liquid's velocity of flow. The apparatus will also be capable of detecting any existing drops of liquid found in the air space, and these will then be perceived by the microprocessor as errors and reported as inaccuracies in the measuring system so that precautions may be taken to remove them or to correct the measurements by other means with respect to these drops.

The system is described above with the use of two measurement chambers, but there is nothing to preclude the use of a plurality of measurement chambers also, as this would employ the same principle as above.

The closing and opening of the respective valves will take place automatically with the aid of the microprocessor, which registers when the respective risers are either full or have reached a certain level, which determines that the valves shall be closed or opened, respectively, as the microprocessor emits the necessary control signals for this function. This is regarded as known art, and it should not be necessary to describe this in more detail in this context.

We claim:

1. A method for continuously measuring the velocity of flow of a liquid in a liquid stream in a pipe line, comprising:
   (a) providing two vertically oriented tubular risers made of transparent material;
   (b) serving each riser at its base with a respective three-way valve which is operable for alternatively:
      (i) in a first position thereof connecting the respective riser at its base with said liquid stream but isolating said riser at its base from a drain, and
      (ii) in a second position thereof connecting the respective riser at its base with the respective said drain and isolating said riser at its base from said liquid stream;
   (c) interconnecting said risers at respective upper ends thereof so as to interconnect headspaces thereof;
   (d) operating said three-way valves so as to fill both of said risers with liquid from said liquid stream, up to like levels, which are intermediate said bases and said upper ends, and leave said interconnected headspaces filled with a gas;
   (e) while substantially uniformly illuminating one of said risers throughout the height thereof from one side thereof using a respective vertically extending light source:
      (i) disposing the three-way valve for one of said risers in said first position thereof and the three-way valve for the other of said risers in said second position thereof, whereby hydraulic pressure due to liquid flow in said pipe line causes liquid to rise above said like level in said one riser, said gas to compress in said interconnected headspaces and force liquid downwards below said like level in said other riser and some to leave said other riser via the respective said drain, until the liquid level in said one riser has risen to a predetermined upper limit level, and
      (ii) continuously while said liquid level is rising in said one riser, sensing light from said vertically extending light source as transmitted through said one riser at each of a plurality of closely vertically spaced sites, to thereby provide at least one information stream of sensations indicative of transmitted light at levels corresponding to each of said sites, and
      (iii) continuously processing said stream of information in a microprocessor to thereby provide an indication of the rising level of the interface between gas and liquid in said one riser, and the rate of rise of said rising level in said one riser as an indication of fluid flow in said liquid stream in said pipe line; and (f) when the liquid level in said one riser has risen to said predetermined upper limit level, and while substantially uniformly illuminating the other of said risers throughout the height thereof from one side thereof using a respective vertically extending light source:

(i) disposing the three-way valve for said one riser in said second position thereof and the three-way valve for said other riser in said first position thereof, whereby hydraulic pressure due to liquid flow in said pipe line causes liquid to rise above said like level in said other riser, said gas to compress in said interconnected headspaces and force liquid downwards below said like level in said one riser and some to leave said one riser via the respective said drain, until the liquid in said other riser has risen to a level corresponding to said predetermined upper limit level, and (ii) continuously while said liquid level is rising in said other riser, sensing light from the respective said vertically extending light source as transmitted through said other riser at each of a plurality of closely vertically spaced sites, to thereby provide at least one information stream of sensations indicative of transmitted light at levels corresponding to each of said sites, and (iii) processing said stream of information in a microprocessor to thereby provide an indication of the rising level of the interface between gas and liquid in said other riser, and the rate of rise of said rising level in said other riser as an indication of fluid flow in said liquid stream in said pipe line; and (g) repeating steps (e) and (f) in alternation with one another to thereby continuously provide an indication of fluid flow in said pipe line.

2. Apparatus for continuously measuring the velocity of flow of a liquid in a liquid stream in a pipe line, comprising:

(a) two vertically oriented tubular risers made of transparent material;

(b) serving each riser at its base a respective three-way valve which is operable for alternatively:

(i) in a first position thereof connecting the respective riser at its base with said liquid stream but isolating said riser at its base from a drain, and (ii) in a second position thereof connecting the respective riser at its base with the respective said drain and isolating said riser at its base from said liquid stream;

(c) tubular structure functionally interconnecting said risers at respective upper ends thereof so as to interconnect headspaces thereof;

(d) said three-way valves being operable so as to fill both of said risers with liquid from said liquid stream, up to like levels, which are intermediate said bases and said upper ends, and leave said interconnected headspaces filled with a gas;

(e) a first vertically extending light source, for substantially uniformly illuminating one of said risers throughout the height thereof from one side thereof;

(f) at least one vertically extensive light sensor arranged for sensing light transmitted through respective of said risers at each of a plurality of closely vertically spaced sites and thereby providing at least one information stream of sensations indicative of transmitted light at levels corresponding to each of said sites;

(g) a microprocessor functionally connected with each said light sensor for receiving said at least one stream of sensations;

(h) said three-way valves further being operable for:

(i) disposing the three-way valve for one of said risers in said first position thereof and the three-way valve for the other of said risers in said second position thereof, whereby hydraulic pressure due to liquid flow in said pipe line causes liquid to rise above said like level in said one riser, said gas to compress in said interconnected headspaces and force liquid downwards below said like level in said other riser and some to leave said other riser via the respective said drain, until the liquid level in said one riser has risen to a predetermined upper limit level, and (ii) continuously while said liquid level is rising in said one riser, sensing light from said vertically extending light source as transmitted through said one riser at each of a plurality of closely vertically spaced sites using a respective said vertically extending light sensor, to thereby provide said at least one information stream of sensations indicative of transmitted light at levels corresponding to each of said sites, and (iii) continuously processing said stream of information in said microprocessor to thereby provide an indication of the rising level of the interface between gas and liquid in said one riser, and the rate of rise of said rising level in said one riser as an indication of fluid flow in said liquid stream in said pipe line; and (i) said three-way valves further being operable when the liquid level in said one riser has risen to said predetermined upper limit level, and while substantially uniformly illuminating the other of said risers throughout the height thereof from one side thereof using a respective vertically extending light source, for:

(i) disposing the three-way valve for said one riser in said second position thereof and the three-way valve for said other riser in said first position thereof, whereby hydraulic pressure due to liquid flow in said pipe line causes liquid to rise above said like level in said other riser, said gas to compress in said interconnected headspaces and force liquid downwards below said like level in said one riser and some to leave said one riser via the respective said drain, until the liquid in said other riser has risen to a level corresponding to said predetermined upper limit level, and (ii) continuously while said liquid level is rising in said other riser, sensing light from the respective said vertically extending light source as transmitted through said other riser at each of a plurality of closely vertically spaced sites using a respective said vertically extending light sensor, to thereby provide said at least one information stream of sensations indicative of transmitted light at levels corresponding to each of said sites, and (iii) processing said stream of information in said microprocessor to thereby provide an indication of the rising level of the interface between gas and liquid in said other riser, and the rate of rise of said rising level in said other riser as an indication of fluid flow in said liquid stream in said pipe line.

3. The method of claim 2, wherein:

each said vertically extending light source is provided by an LED array having a light diffuser functionally associated therewith, for evening-out light emanated towards the respective said riser.

4. The method of claim 3, wherein:

each said vertically extensive light sensor is provided by a CCD image sensor functionally coupled to an A/D converter.

5. The method of claim 2, wherein:

each said vertically extensive light sensor is provided by a CCD image sensor functionally coupled to an A/D converter.

6. The apparatus of claim 2, further including:

means functionally interconnecting said microprocessor with said three-way valves, for switching positions of said three-way valves when liquid level in a respective riser is sensed by a respective sensor to have risen to said predetermined upper limit level.

* * * * *

UNITED STATES PATENT AND TRADEMARK OFFICE
CERTIFICATE OF CORRECTION

PATENT NO. : 5,333,497
DATED : August 2, 1994
INVENTOR(S) : BRAEND et al.

It is certified that error appears in the above-indentified patent and that said Letters Patent is hereby corrected as shown below:

On the title page, under item [19], correct first-named inventor to read --Braend--; and
item [75] correct first-named inventor to read --Dag Arne Braend--.

Signed and Sealed this

Fourth Day of October, 1994

Attest:

BRUCE LEHMAN

Attesting Officer

Commissioner of Patents and Trademarks